UNITED STATES PATENT OFFICE.

ISAAC ELSASSER, OF HOUSTON, TEXAS.

FERTILIZER.

SPECIFICATION forming part of Letters Patent No. 253,991, dated February 21, 1882.

Application filed September 24, 1881. (No specimens.)

*To all whom it may concern:*

Be it known that I, ISAAC ELSASSER, a citizen of the United States, residing at Houston, in the county of Harris and State of Texas, have invented certain new and useful Improvements in Fertilizers; and I do hereby declare the following to be a full, clear, and exact description of the invention, such as will enable others skilled in the art to which it appertains to make and use the same.

The present invention relates to a fertilizer for restoring to the soil the elements which form the food for plants, and which have been abstracted therefrom by the absorption of successive crops, or which are naturally deficient in quantity or entirely wanting in the soil.

The invention consists in a fertilizer formed by the combination or admixture of the ingredients hereinafter specified and claimed.

In preparing my fertilizer I take the shell known as the "*Gnathadon cuneata*," beds or deposits of which are found on the coast of Mexico and the Gulf States. These shells, being of a soft and friable nature, are easily reduced to a powder without the assistance of a calcining operation. Fifty parts of the crude pulverized shell above mentioned are combined with fifteen parts of bat-guano, twenty parts of cotton-seed meal, and fifteen parts of bone-dust.

A fertilizer consisting of the substances mentioned is readily soluble in any kind of soil, and possesses the properties of stimulating and forcing the growth of vegetation to a degree not possessed by fertilizers or artificial manures known to me.

The rationale of my invention is as follows, viz: The bat-guano (obtained from the bat-caves found in Texas and elsewhere) consists partly of chitine and other proteine substances, but chiefly of soluble nitrates. The fertilizing constituents of the cotton-seed meal are fibrine, gluten, and other proteine substances of a nitrogenous nature. The chitine and gluten combine with the nitric acid set free from the nitrates by chemical action of the soil, and form a gelatinous matter which retains the nitric acid. This gelatinous matter, being of an organic nature, is decomposed by the action of the soil setting free the nitric acid in a slow or gradual manner, so as to be entirely absorbed by the plants, at the same time producing ammonia by its slow decomposition, which ammonia is also absorbed by the plants. The bat-guano contains an overplus of nitrates, and hence a fertilizer containing the same requires the addition of a vehicle which will combine with said nitrates. The vehicle employed by me consists of the pulverized shell of the *Gnathadon cuneata*, which contains lime, magnesia, potash, sodium, and other elements, and a considerable percentage of organic matter in the form of proteine substances. The latter readily combine with the nitrates of the bat-guano, thus preventing the cohesion of gelatinous matters and facilitating the distribution of the fertilizer. The alkaline constituents of the pulverized shell will also promote and accelerate the decomposition of the organic matter contained in the soil.

Having thus described my invention, what I claim as new, and desire to secure by Letters Patent, is—

The fertilizer herein described, consisting of bat-guano, cotton-seed meal, the crude pulverized shell known as "*Gnathadon cuneata*," and bone-dust, as and for the purpose specified.

In testimony whereof I affix my signature in presence of two witnesses.

ISAAC ELSASSER.

Witnesses:
G. W. SCHEULTZ,
JACOB HORNBERGER.